United States Patent [19]
Takeuchi et al.

[11] Patent Number: 5,473,971
[45] Date of Patent: Dec. 12, 1995

[54] RODLESS CYLINDER

[75] Inventors: Terumasa Takeuchi, Aichi; Yoshinori Nozawa, Kasugai; Daiju Maki, Aichi; Masatoshi Shiino, Kakamigahara, all of Japan

[73] Assignee: CDK Corporation, Komosaki, Japan

[21] Appl. No.: 134,104

[22] Filed: Oct. 8, 1993

[30] Foreign Application Priority Data

| Oct. 8, 1992 | [JP] | Japan | 4-270530 |
| Nov. 2, 1992 | [JP] | Japan | 4-476000 |
| Nov. 20, 1992 | [JP] | Japan | 4-312394 |

[51] Int. Cl.$^6$ .............................. F01B 29/00; F01B 9/00
[52] U.S. Cl. .................. 92/88; 92/137; 91/459; 277/DIG. 7
[58] Field of Search ............... 92/88, 137, 165 R; 91/459, 41, 45; 277/DIG. 7

[56] References Cited

U.S. PATENT DOCUMENTS

| 4,373,427 | 2/1983 | Garlapaty et al. | 92/88 |
| 4,733,604 | 3/1988 | Lipinski | 92/88 |
| 4,813,341 | 3/1989 | Vaughn | 92/88 |
| 4,926,982 | 5/1990 | Granbom | 92/88 X |
| 5,020,421 | 6/1991 | Podlesak | 92/137 |
| 5,035,171 | 7/1991 | Gottling et al. | 92/137 |
| 5,111,913 | 5/1992 | Granbom | 92/88 X |
| 5,205,204 | 4/1993 | Gottling et al. | 92/88 X |
| 5,277,101 | 1/1994 | Matsuki et al. | 92/88 X |
| 5,305,682 | 4/1994 | Kaneko | 92/88 X |

*Primary Examiner*—Edward K. Look
*Assistant Examiner*—Hoang Nguyen
*Attorney, Agent, or Firm*—Stetina Brunda & Buyan

[57] ABSTRACT

Disclosed is a rodless cylinder having a cylinder barrel with a slit formed axially therein. A piston is movably housed in the cylinder barrel. A mounting table is disposed movably along the external surface of the cylinder barrel and connected to the piston through the slit. An external actuator is mounted on the mounting table and designed to be driven by a pressure fluid. A passage, through which a pressure fluid can pass, is defined in the cylinder barrel. An inlet is provided in the cylinder barrel so as to introduce the pressure fluid in the passage to the mounting table side. An outlet is provided on the mounting table so as to supply the pressure fluid introduced from the inlet to the external actuator.

16 Claims, 14 Drawing Sheets

5,473,971

RODLESS CYLINDER

BACKGROUND OF THE INVENTION

1. Field of the Invention

The present invention relates to a rodless cylinder including a cylinder barrel, a piston housed in the cylinder barrel and a mounting table disposed on the external surface of the cylinder barrel, wherein the piston and the mounting table are connected to each other so that they can be moved together. More particularly, the present invention relates to a rodless cylinder equipped with a mechanism for supplying a pressure fluid to an external actuator mounted on the mounting table.

2. Description of the Related Art

In a rodless cylinder, generally, a piston is movably housed in a cylinder barrel, and a mounting table, which is disposed outside of the cylinder barrel, is connected to the piston so as to be able to move together therewith. The reason why such type of cylinder is called rodless cylinder is because no piston rod is connected to the piston thereof. The piston is reciprocated with the aid of the air supplied into the cylinder barrel, and the mounting table is reciprocated along the cylinder barrel following the movement of the piston. Accordingly, if an external actuator such as a chuck is mounted on the mounting table, various subassemblies can be transported between two arbitrary positions by operating the chuck interlocking with the movement of the piston.

In the conventional rodless cylinder, a mounting table 52 is provided on the external surface of a cylinder barrel 51, for example, as shown in FIG. 19. Various types of external actuators can be mounted on the mounting table 52. The external actuators include, for example, a chuck 55 for holding articles, a cylinder barrel 53 for reciprocating the chuck 55 along the axis Z and a braking device for applying a braking force to the piston housed in the rodless cylinder. In the conventional rodless cylinder described above, flexible pipes 54 are disposed, independent of the pipe for supplying air into the rodless cylinder, through which air is supplied from an air supply source to the external actuator.

However, the flexible pipes 54 must be disposed separately for the external actuator in the conventional rodless cylinder, so that the piping operation becomes troublesome. Moreover, since the flexible pipes 54 are flexed repeatedly following the movement of the mounting table 52, the parts in the air supply system including these pipes are worn rapidly, and these parts must be replaced soon. In addition, a wide installation space must be secured so as to prevents the flexible pipes 54 from interfering with the operators or the peripheral equipments.

The present invention has been proposed with a view to solving the above problems, and it is an object of the invention to provide a rodless cylinder which enables easy piping operation for the external actuator and which can prevent troubles attributable to the piping from occurring.

SUMMARY OF THE INVENTION

In order to achieve the objects, the rodless cylinder according to the present invention has a slit extending axially on the external surface of the cylinder barrel thereof. A piston is movably housed in the cylinder barrel. A mounting table is disposed movably along the external surface of the cylinder barrel and connected to the piston through the slit. An external actuator is mounted on the mounting table and driven with the aid of a pressure fluid. A passage is defined in the cylinder barrel, through which the pressure fluid can pass. An inlet is also defined in the cylinder barrel, through which the pressure fluid in the passage is fed out to the mounting table side. An outlet is formed on the mounting table, through which the pressure fluid fed out through the inlet is supplied to an external actuator.

BRIEF DESCRIPTION OF THE DRAWINGS

The features of this invention that are believed to be novel are set forth with particularity in the appended claims. The invention, together with the objects and advantages thereof, may best be understood by reference to the following description of the preferred embodiments taken in conjunction with the accompanying drawings in which:

DETAILED DESCRIPTION OF PREFERRED EMBODIMENTS

Figure 1:
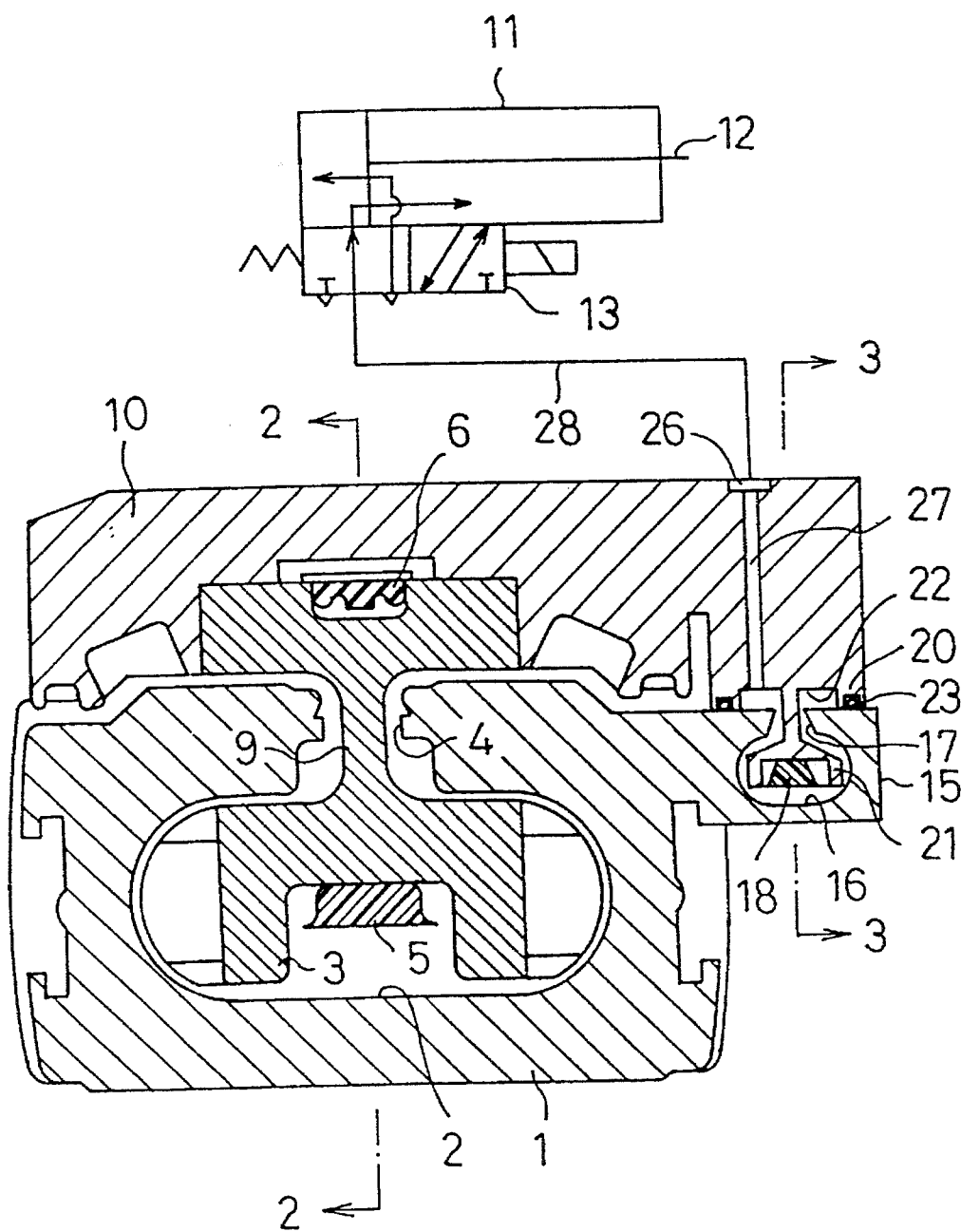
FIG. 1 shows in cross-sectional view a rodless cylinder according to a first embodiment of the invention.
Figure 2:
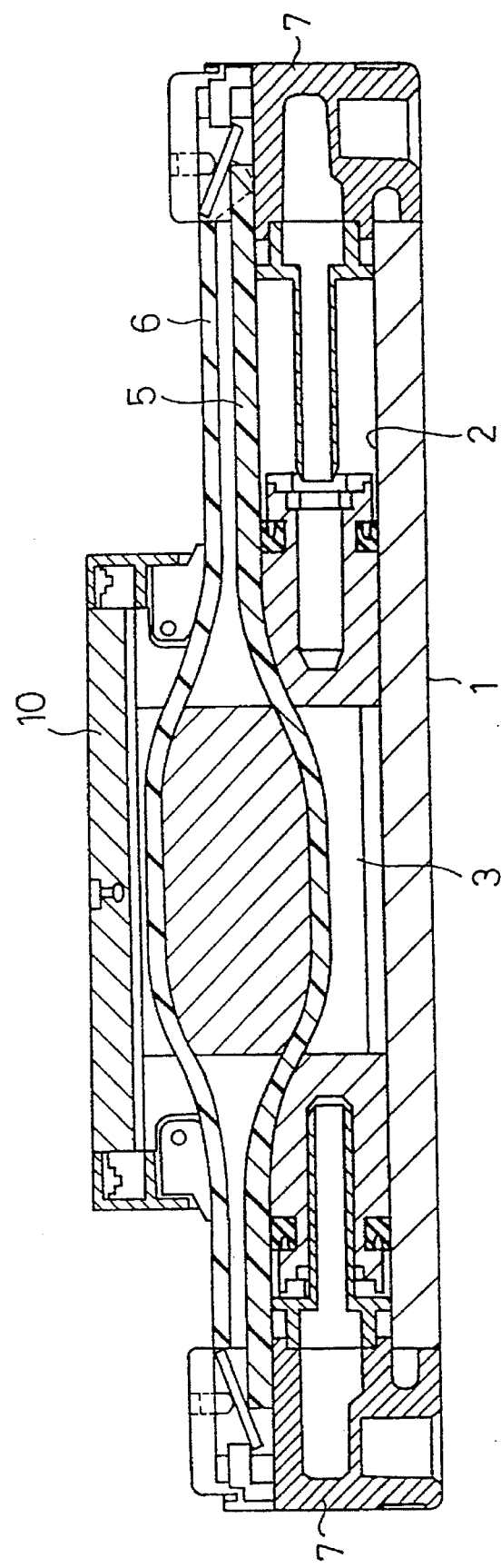
FIG. 2 shows in reduced cross-sectional view the rodless cylinder taken along the line 2—2 of FIG. 1.
Figure 3:
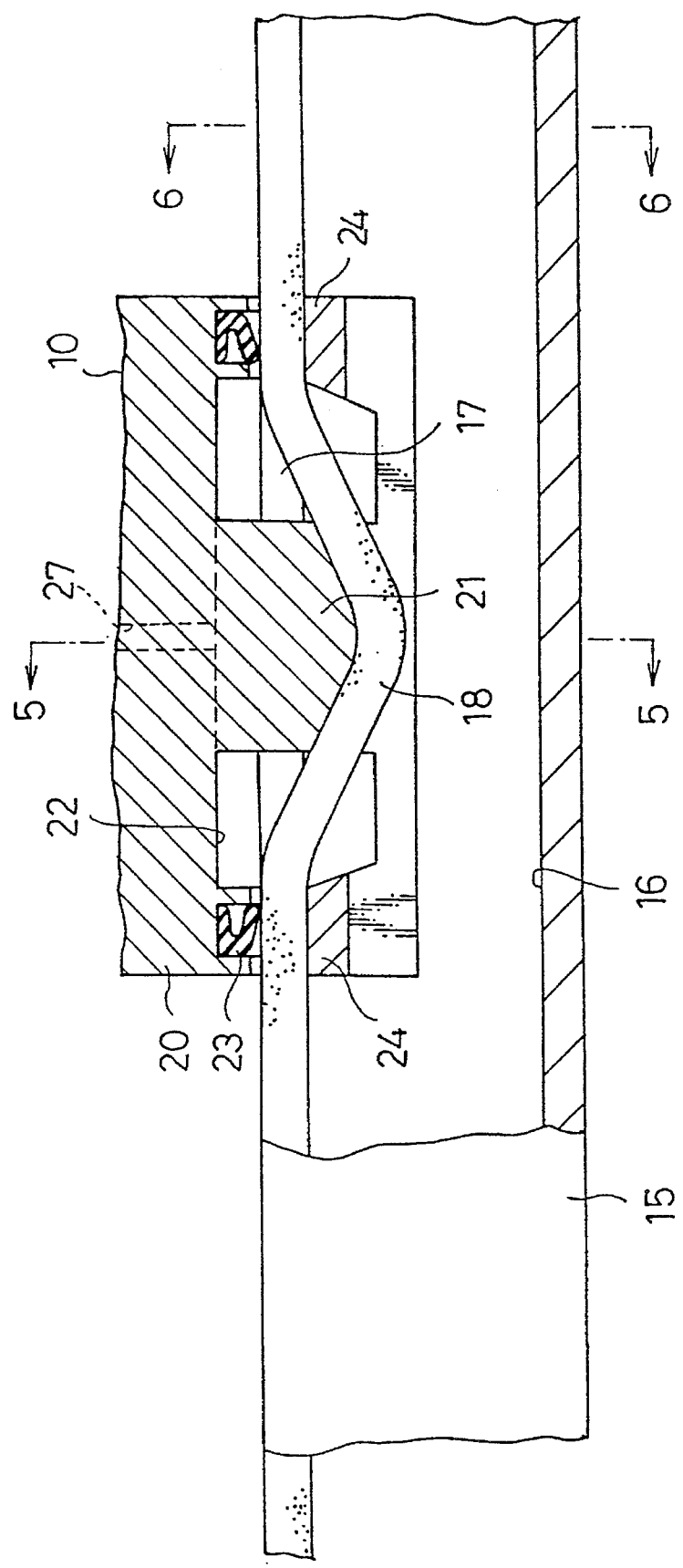
FIG. 3 shows in enlarged cross-sectional view the rodless cylinder taken along the line 3—3 of FIG. 1.
Figure 4:
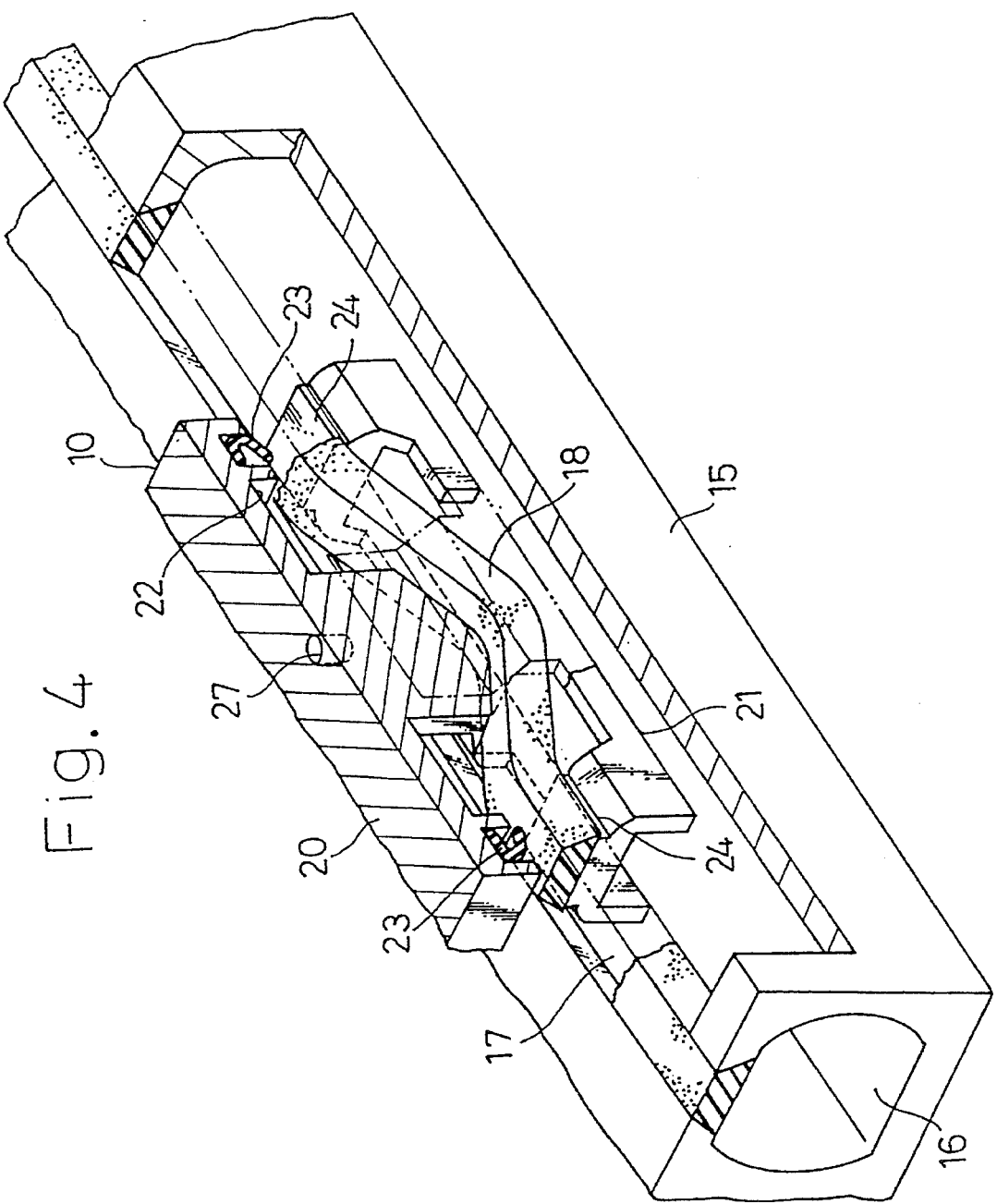
FIG. 4 shows in perspective view the air supply mechanism of the rodless cylinder shown in FIG. 1.
Figure 5:
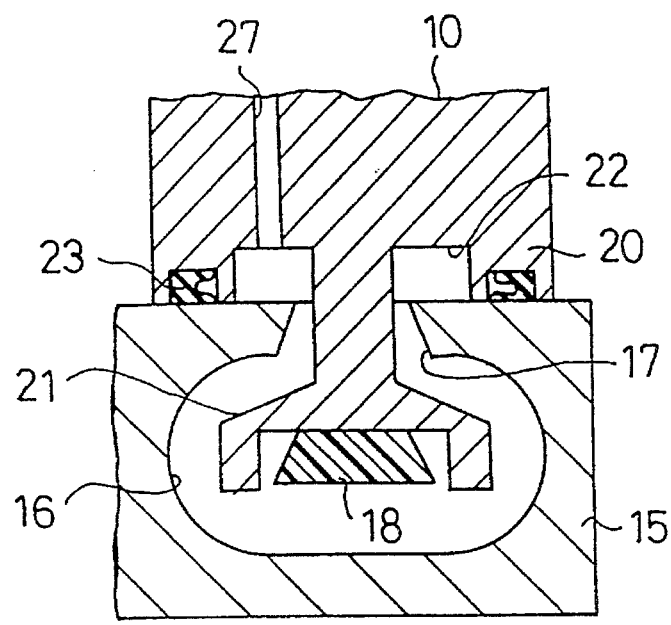
FIG. 5 shows a cross-sectional view taken along the line 5—5 of FIG. 3.
Figure 6:
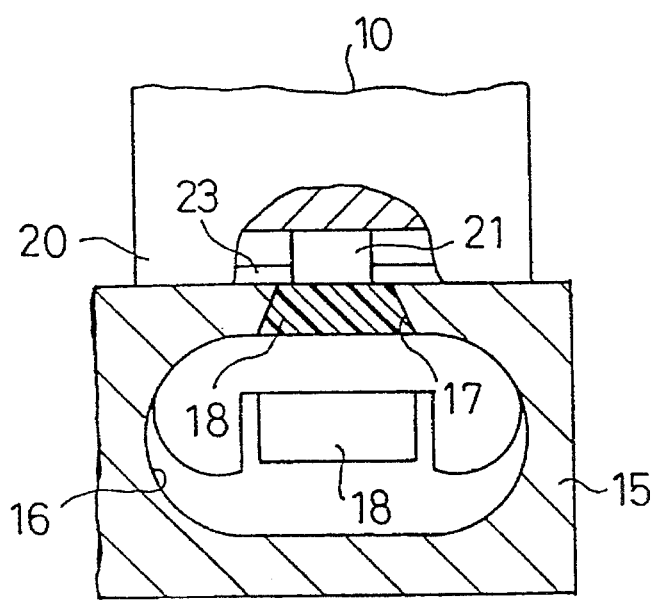
FIG. 6 shows a cross-sectional view taken along the line 6—6 of FIG. 3.

A first embodiment of the invention will now be described below referring to FIGS. 1 to 6. As shown in FIGS. 1 and 2, a pressure chamber 2 is defined in a cylinder barrel 1 in which a piston 3 is disposed so as to be able to reciprocate along the longitudinal direction of the cylinder barrel 1. A slit 4 is defined in the upper wall of the cylinder barrel 1. End caps 7 are fitted to both ends of the cylinder barrel 1.

A connecting section 9 is formed integrally with the piston 3 and protrudes through the slit 4 to the outside of the cylinder barrel 1. A mounting table 10, which is disposed on the external surface of the cylinder barrel 1, is connected to the piston 3 by the connecting section 9 so that the piston 3 and the mounting table 10 can be moved together. An inner seal belt 5 and an outer seal belt 6 are disposed along the inner edges and outer edges of the slit 4, and they are fixed at each end portion onto the end caps 7, respectively. The inner seal belt 5 is inserted partly through the cavity defined on the lower portion of the piston 3, while the outer seal belt 6 is inserted partly through the cavity defined between the mounting table 10 and the connecting section 9.

An air cylinder 11 is mounted as an external actuator on the mounting table 10. The direction in which the piston rod 12 of the air cylinder 11 is moved can be shifted by an electromagnetic valve 13.

A piping section 15 is formed integrally on one side of the cylinder barrel 1 along the entire length thereof. As shown in FIGS. 3 to 6, an air passage 16 is defined through the inside of the piping section 15 as a pressure fluid passage. Each end of the air passage 16 is hermetically sealed by the end caps 7. An air port (not shown) for supplying air as a pressure fluid therethrough to the air passage 16 is provided in one end cap 7. A slit 17 is formed on the upper portion of the piping section 15, through which the air in the air passage 16 is designed to be introduced to the mounting table side. The slit 17 is sealed internally by a seal belt 18.

A sliding section 20 is formed integrally with the mounting table 10, which slides on the piping section 15 as the mounting table 10 reciprocates. The sliding section 20 has a yoke 21 which is inserted to the air passage 16. The yoke 21 pushes down the seal belt 18 successively to open the slit 17 partly as it moves. Air pockets 22 are defined on the sliding section 20 to open downward. A packing 23 is disposed around the air pockets 22 so as to surround the portion of the slit 17 let open by the yoke 21. The packing 23 is brought into press contact with the upper surface of the piping section 15 to prevent air leakage through the slit 17. Pressing portions 24 protrude upward at each end portion of the yoke 21. The pressing portions 24 are designed to press the seal belt 18 against the packing 23 to enhance airtightness by the packing 23.

As shown in FIG. 1, an outlet 26 is provided on the upper surface of the mounting table 10. The air pockets 22 are connected to the outlet 26 through a communicating path 27 defined in the mounting table 10. The outlet 26 is connected to the electromagnetic valve 13 through an air piping 28 so as to feed the air taken out of the slit 17 to the air cylinder 11. Incidentally, the air piping 28 may be provided on the air cylinder 11.

In the thus constituted rodless cylinder, the mounting table 10 is moved integrally with the piston 3. With the movement of the mounting table 10, the slide section 20 slides on the piping section 15 to press down the seal belt 18 by the yoke 21 and open the slit 17 partly. The air in the air passage 16 is led out to the mounting table side through the slit 17 and supplied from the outlet 26 defined on the mounting table 10 to the air cylinder 11 through the air piping 28 and the electromagnetic valve 13.

Thus, in this embodiment, air can be supplied to the air cylinder 11 simply by connecting the air piping 28 to the outlet 26. Meanwhile, since the air passage 16 is defined in the cylinder barrel 1, it does not move following the motion of the mounting table 10. Accordingly, the longevity of the parts in the air supply system including the piping section 15 and the air piping 28 can be extended, and besides there is no need of securing the space for moving the pipe. Moreover, there is no fear of interference between the pipes and operators or peripheral equipments. Further, since the piping section 15 and the sliding section 20 are formed integrally with the cylinder barrel 1 and the mounting table 10 respectively in this embodiment, the rodless cylinder as a whole can be manufactured at a low cost, advantageously.

Figure 7:
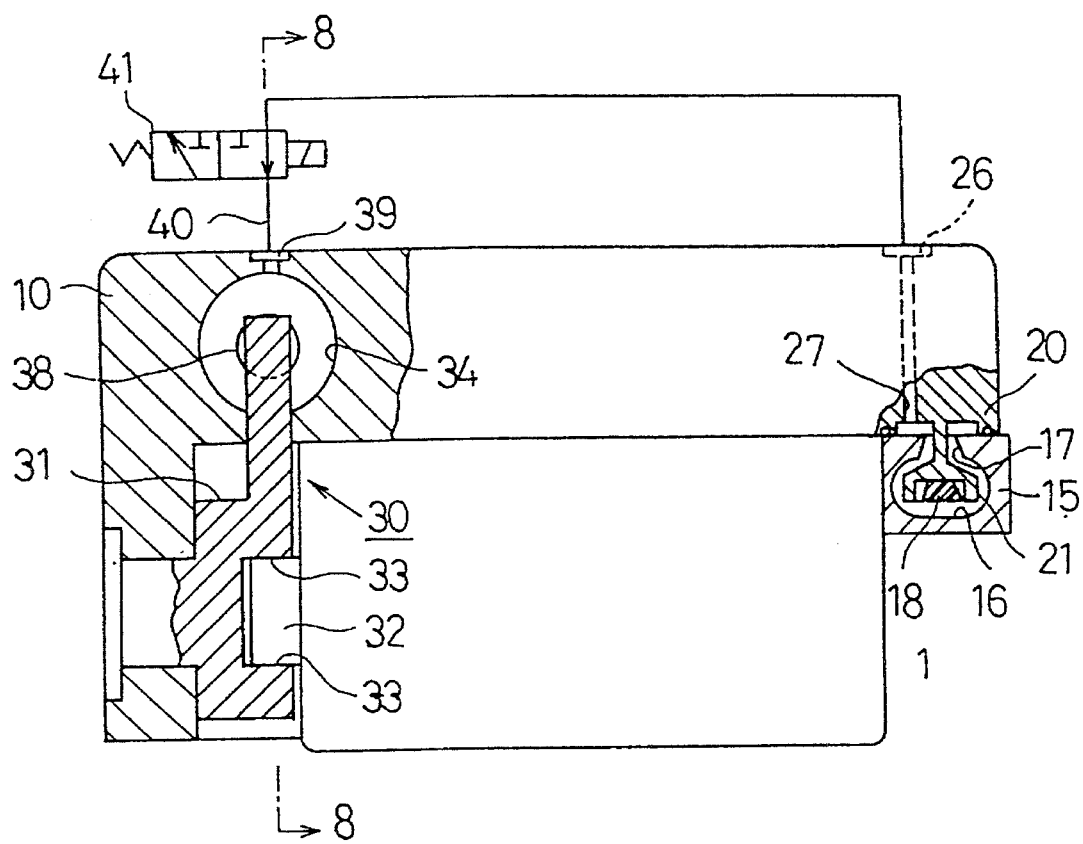
FIG. 7 shows in cross-sectional view the major portion of a rodless cylinder on which another exemplary external actuator is mounted.
Figure 8:
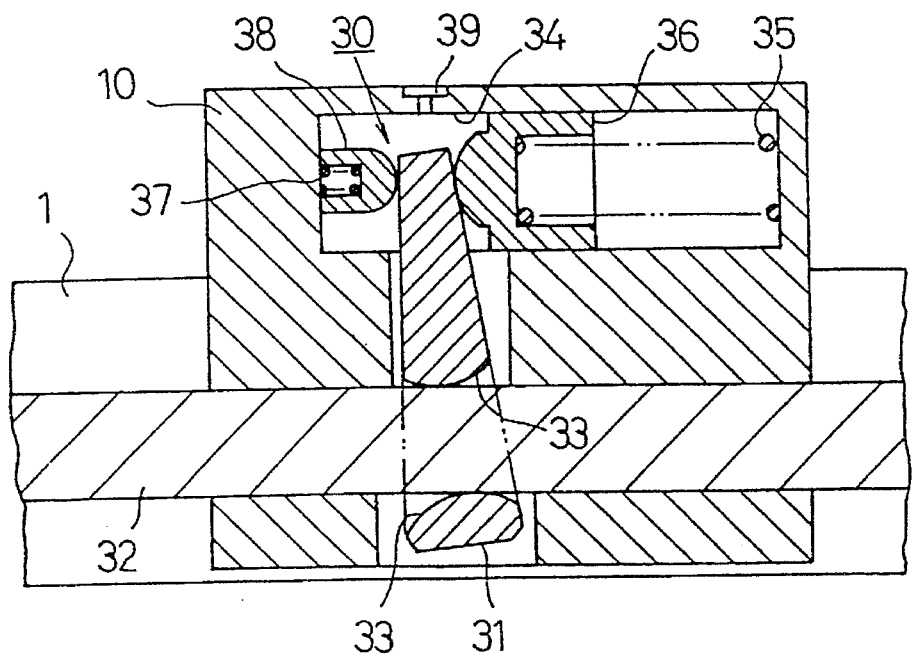
FIG. 8 shows a cross-sectional view taken along the line 8—8 of FIG. 7.

FIGS. 7 and 8 shows another example of the external actuator, in which a braking device 30 for applying a braking force to the rodless cylinder is mounted on the mounting table 10. The braking device 30 has a brake member 31 which is supported in the mounting table 10 so as to be able to swing therein. A brake rail 32 protrudes along one side face of the cylinder barrel 1. A pair of cam surfaces 33, which are engageable with the brake rail 32, are formed in the brake member 31.

A pressure chamber 34 is defined in the mounting table 10, in which a piston 36 and a pusher 38 are disposed to oppose to each other. The piston 36 is urged by a spring 35 having a strong resilience to be engaged with one side of the brake member 31. The pusher 38 is urged by a spring 37 having a weak resilience to be engaged with the other side of the brake member 31. The mounting table 10 is provided with an air inlet 39 communicating to the pressure chamber 34. The air inlet 39 is connected to an outlet 26, in the same manner as described in the above embodiment, through an air piping 40 and an electromagnetic valve 41.

The electromagnetic valve 41 is energized while the rodless cylinder is in operation to allow the air to be supplied from the outlet 26 through the air inlet 39 to the pressure chamber 34, whereby the piston 36 is retracted against the resilience of the spring 35 to allow the brake member 31 to be swung by the pusher 38 clockwise in terms of FIG. 8. Thus, the cam surfaces 33 are spaced from the brake rail 32, and the braking force is released. Meanwhile, the electromagnetic valve 41 is deenergized while the rodless cylinder is out of operation to release the air within the pressure chamber 34. Accordingly, the piston 36 is shifted toward the brake member 31 by the resilience of the spring 35, whereby the brake member 31 is swung counterclockwise in terms of FIG. 8 to allow the cam surfaces 33 to engage with the brake rail 32, and thus a braking force is applied to the mounting table 10.

Since the outlet 26 is provided on the mounting table 10 also in this example of external actuator, the length of the air piping 40 can greatly be reduced compared with the conventional rodless cylinder. Accordingly, the possible troubles due to the piping can be prevented, and the braking device 30 can be operated securely and safely.

Figure 9:
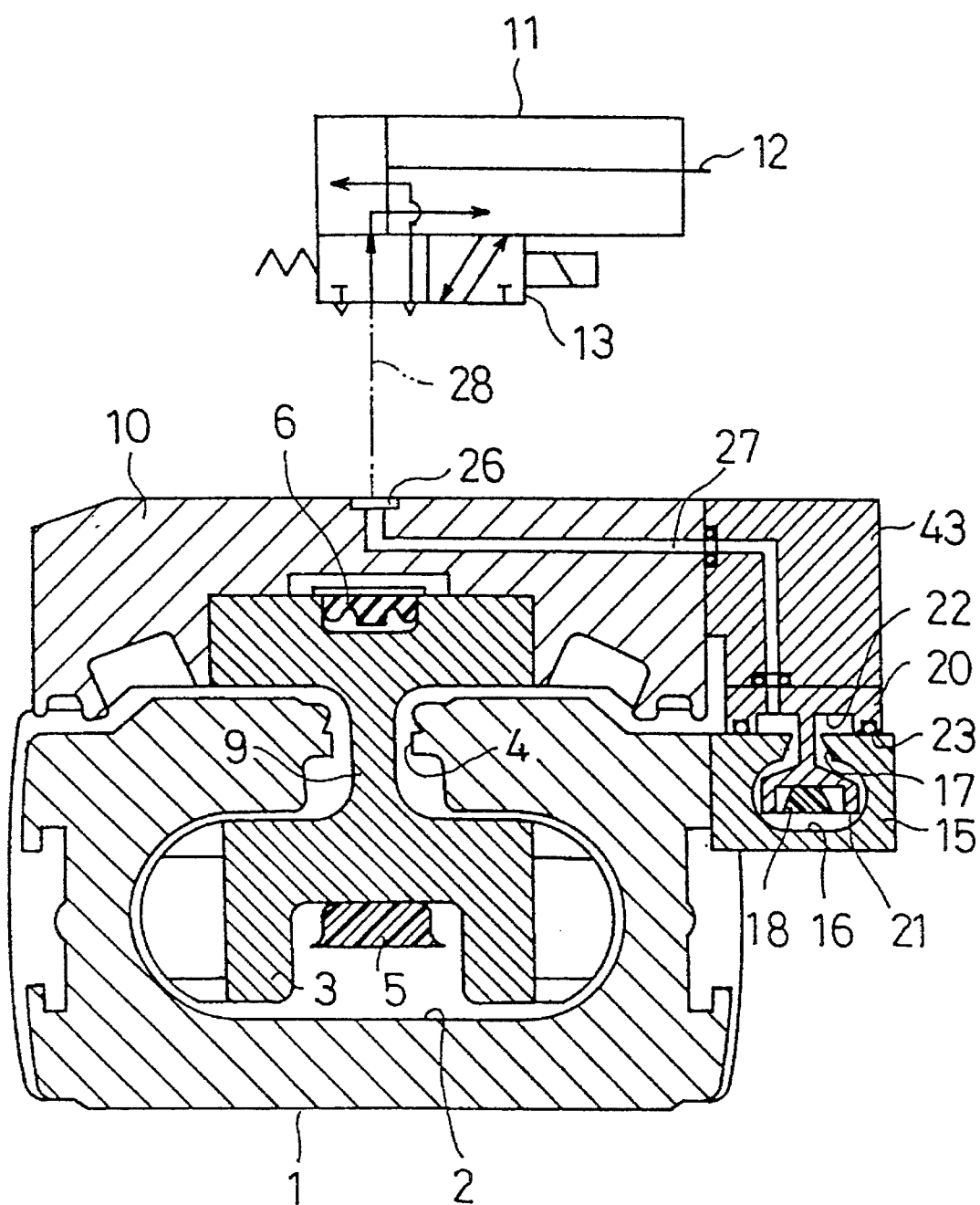
FIG. 9 shows in cross-sectional view a variation of the rodless cylinder of the invention.
Figure 10:
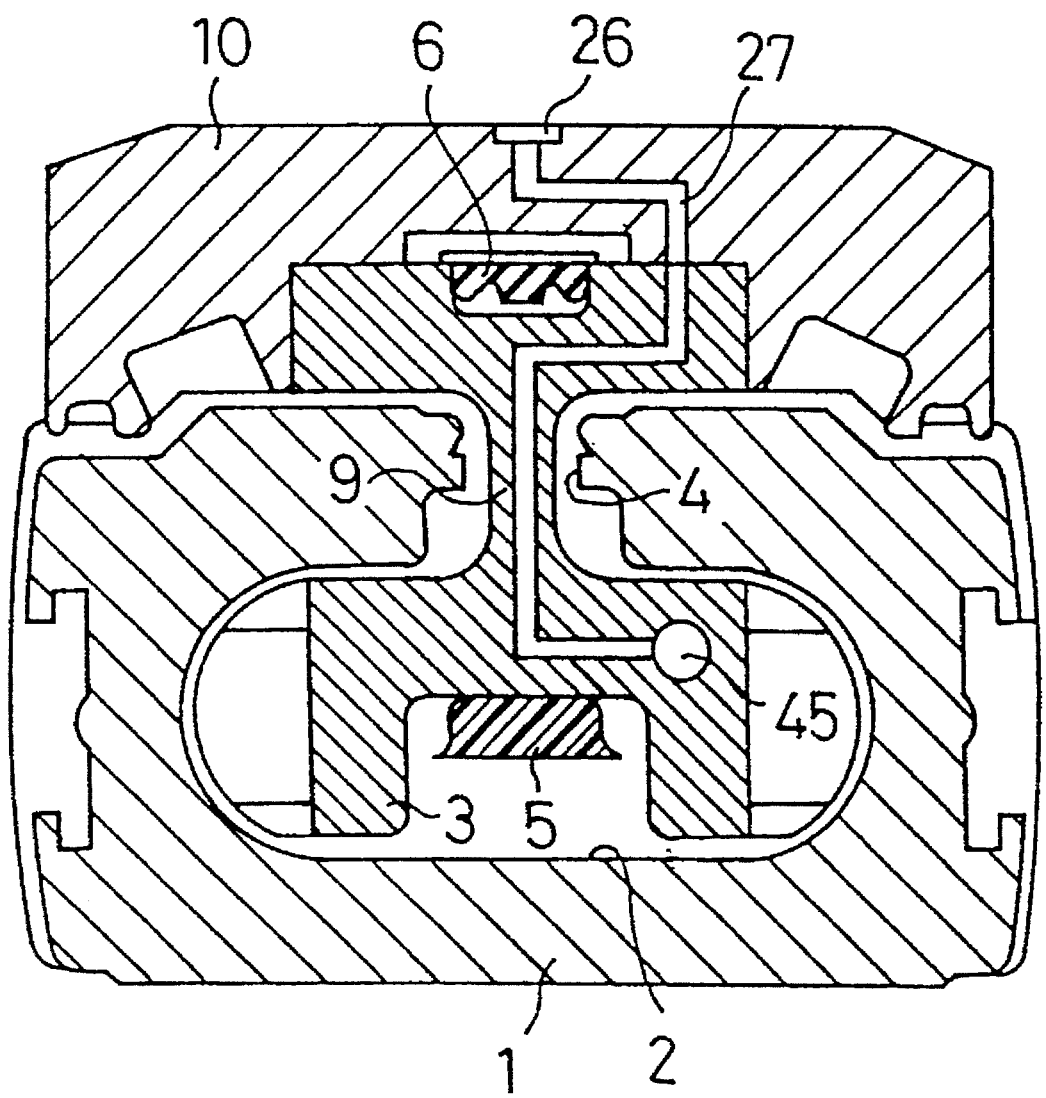
FIG. 10 shows in cross-sectional view another variation of the rodless cylinder of the invention.

The present invention is not limited to the above embodiment, and many other variations are possible by appropriately changing the shapes of the respective parts and the constitution, for example:

(1) The piping section 15 may be formed separately from the cylinder barrel 1 and can be fixed to the cylinder barrel 1 using fastening means such as bolts, as shown in FIG. 9;

(2) The sliding section 20 may be formed separately from the mounting table 10 and can be fixed to the mounting table 10 using fastening means such as bolts via an intermediate block 43, as shown in FIG. 9;

(3) The pressure chamber 2 of the cylinder barrel 1 may also be used as an air passage, while an air inlet 45 may be formed in the piston 3, and a communicating path 27 may be formed through the piston 3 and the mounting table 10 to be connected to the outlet 26, as shown in FIG. 10;

(4) A chuck, a vacuum device, an air motor, etc. may be mounted as the external actuator on the mounting table 10; or (5) The rodless cylinder according to the present invention may be applied to rodless cylinders which are operated by hydraulic pressure or by various gases other than air.

A second embodiment of the rodless cylinder according to the present invention will now be described referring to FIGS. 11 and 12.

Figure 11:
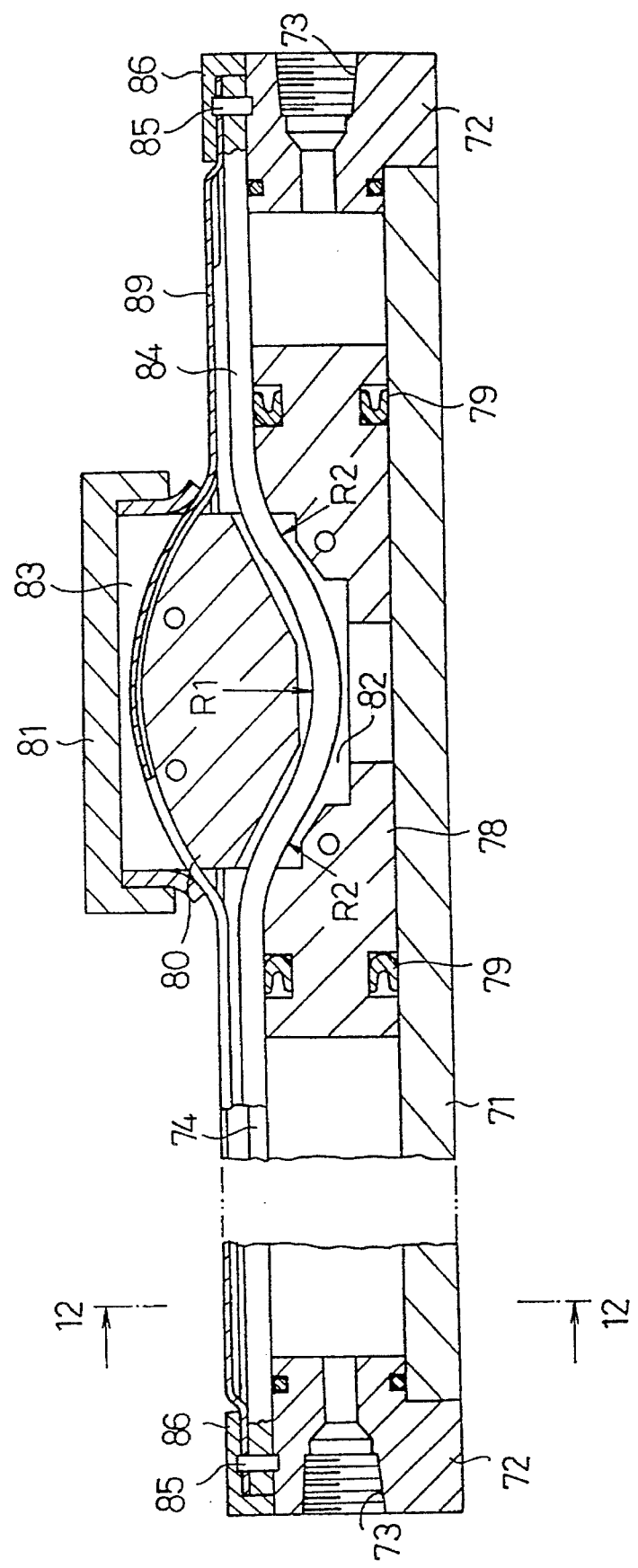
FIG. 11 shows in cross-sectional view a rodless cylinder according to a second embodiment of the invention.
Figure 12:
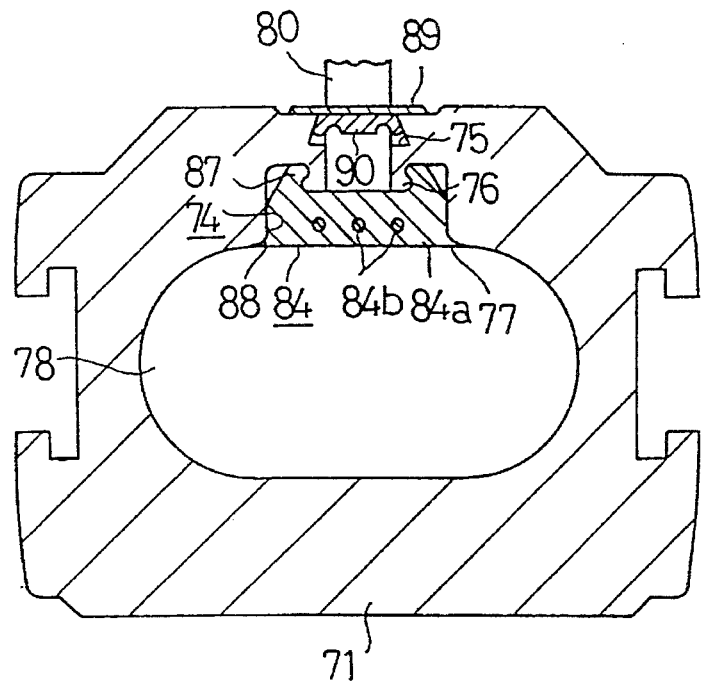
FIG. 12 shows an enlarged cross-sectional view taken along the line 12—12 of FIG. 11.

As shown in FIGS. 11 and 12, a cylinder barrel 71 having a substantially cylindrical form is open at both ends. A pair of end caps 72 are fitted to both end openings of the cylinder barrel 71 and fixed therein. Each end cap 72 has a port 73 at the center thereof. A slit 74 is formed on the upper portion of the cylinder barrel 71. The slit 74 has on each side thereof inclined surfaces 75 at the upper portion, engaging sections 76 in the middle portion and sealing surfaces 77 at the lower portion.

A piston 78 is movably housed in the cylinder barrel 71, and seal rings 79 are fitted around both end portions. A connecting section 80 is formed integrally with the piston 78 to protrude from the middle of the length thereof upward and outward through the slit 74, with a mounting table 81 being fixed to the upper end of the connecting section 80. A lower arcuate cavity 82 is defined between the piston 78 and the connecting section 80, while an upper arcuate cavity 83 is defined between the connecting section 80 and the mounting table 81.

The seal belt 84 is fixed at both end portions onto the end caps 72 respectively by pins 85 and fixtures 86. The seal belt 84 is fitted along the inner edges of the slit 74 in the cylinder barrel 71 and also inserted partly to the lower arcuate cavity 82. The seal belt 84 has engaging sections 87, on each side thereof, which engage with the corresponding engaging sections 76 of the slit 74, and also has sealing sections 88 which are abutted against the corresponding sealing surfaces 77 of the slit 74.

The seal belt 84 employed in the second embodiment of the invention comprises an elastic base material 84a such as rubber and a flexible reinforcing material 84b embedded in the base material 84a. The reinforcing material 84b consists of extra fine reinforced monofilament such as of polyamide twisted into a yarn, and a plurality of yarns as the reinforcing materials 84b are embedded in the base material 84a parallel to one another in the longitudinal direction of the base material 84a.

An outer seal belt 89 is fixed at both end portions onto the end caps 72 by the pins 85 and fixtures 86, extended along the outer edges of the slit 74 defined in the cylinder barrel 1 and inserted partly to the upper arcuate cavity 83. The outer seal belt 89 is provided, at its lower portion, with an engaging section 90 which engages with the inclined surfaces 75 of the slit 74.

In the thus constituted rodless cylinder, when a pressure fluid such as air is supplied through the right port 73 to the right cylinder chamber of the cylinder barrel 71, the piston 78 is pushed leftward within the cylinder barrel 71 to move the connecting section 80 and the mounting table 81 together in the same direction. Meanwhile, when the pressure fluid is supplied through the left port 73 into the left cylinder chamber of the cylinder barrel 71, the piston 78 is pushed rightward to move the connecting section 80 and the mounting table 81 together in the same direction.

As the connecting section 80 and the mounting table 81 are moved, the seal belt 84 is moved relative to them passing through the lower arcuate cavity 82 defined between the piston 78 and the connecting section 80, while the seal belt 84 is being flexed downward. Meanwhile, the outer seal belt 89 is moved relative to the connecting section 80 and the mounting table 81 passing through the lower arcuate cavity 83 defined between the connecting section 80 and the mounting table 81, while the outer seal belt 89 is being flexed upward.

Since the seal belt 84 comprises the elastic base material 84a and the flexible reinforced fiber reinforcing material 84b embedded in the base material 84a, the tensile strength of the seal belt 84 can be increased without reducing flexibility thereof. Accordingly, the radii of curvature R1, R2 at the portion of the seal belt 84 passing through the lower arcuate cavity 82 need not be set to large levels, so that the rodless cylinder can as a whole be downsized by reducing the dimension in the axial direction.

The internal pressure of the cylinder barrel 71 exerted to the seal belt 84 thicknesswise and the tensile force applied to the seal belt 84 lengthwise under the operation of the piston 78 are sustained by the elastic base material 84a and the reinforcing material 84b, respectively. Accordingly, the liability to drop in the sealing effect due to elongation of the seal belt 84 with the extended use of the rodless cylinder can securely be prevented.

Figure 13:
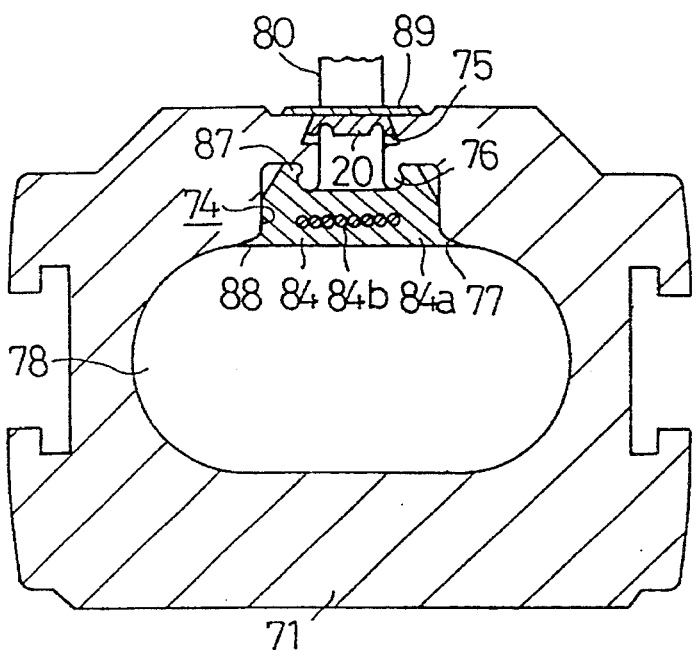
FIG. 13 shows in cross-sectional view a variation of the rodless cylinder according to the second embodiment of the invention.

Next, a variation of the second embodiment will be described referring to FIG. 13.

In the variation, like in the second embodiment, the seal belt 84 is formed using an elastic base material 84a such as rubber and a flexible reinforcing material 84b embedded in the base material 84a. The reinforcing material 84b employed in the variation is woven into a fabric using warp and weft formed by twisting extra fine reinforced monofilament such as of polyamide.

Therefore, in the variation, the tensile force applied to the seal belt 84 lengthwise during the operation of the piston 78 is shared and sustained by the warp and weft of the fabric reinforcing material 84b. Thus, according to the variation, the tensile strength of the seal belt 84 can further be increased, and also the elongation of the seal belt 84 can be prevented over an extended period.

Incidentally, it is also possible to use a reinforced fiber other than those described above as the reinforcing material 84b of the seal belt 84.

Figure 14:
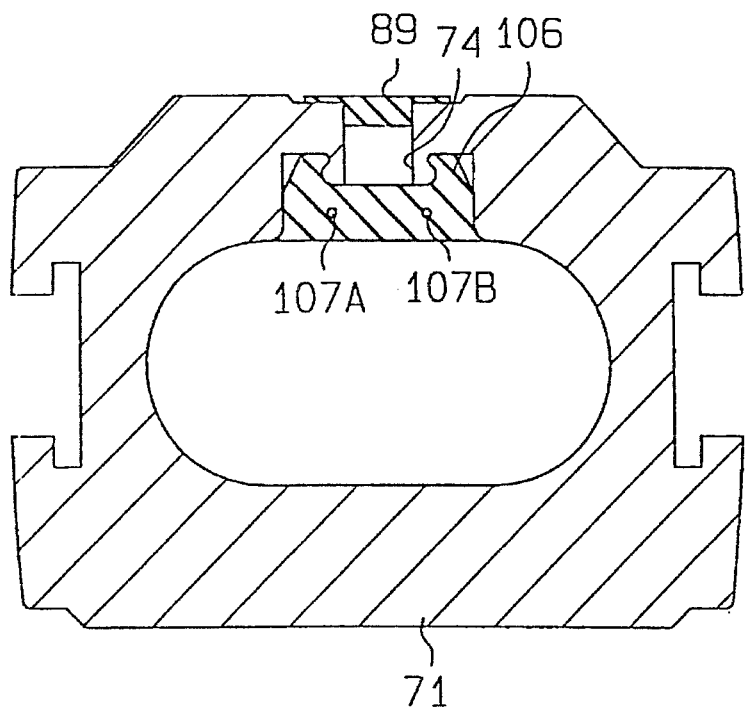
FIG. 14 shows in cross-sectional view a rodless cylinder according to a third embodiment of the invention.
Figure 15:
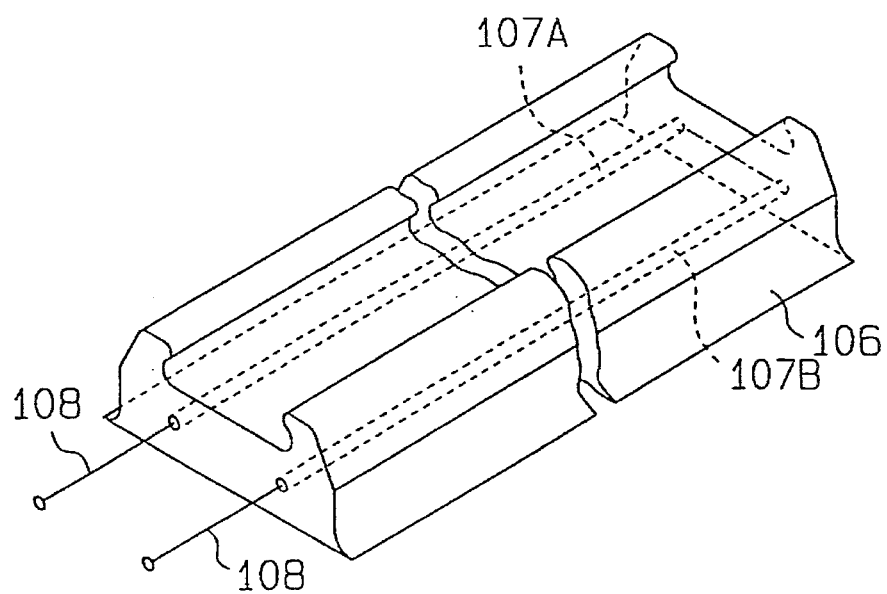
FIG. 15 shows in perspective view a seal belt employed in the third embodiment of the invention.

Next, a third embodiment of the invention will be described with respect to the seal belt 84 referring to FIGS. 14 to 16. The seal belt 106 employed in the third embodiment consists, for example, of a nonconductive soft material such as Kevler and urethane rubber, and a couple of copper wires 107A, 107B are embedded substantially over the full length thereof. The size of the copper wires 107A, 107B is designed by twisting extra fine filament having a diameter of, for example, about 0.03 mm so as to yield weaker force than the force required for cutting the seal belt 106.

Figure 16:
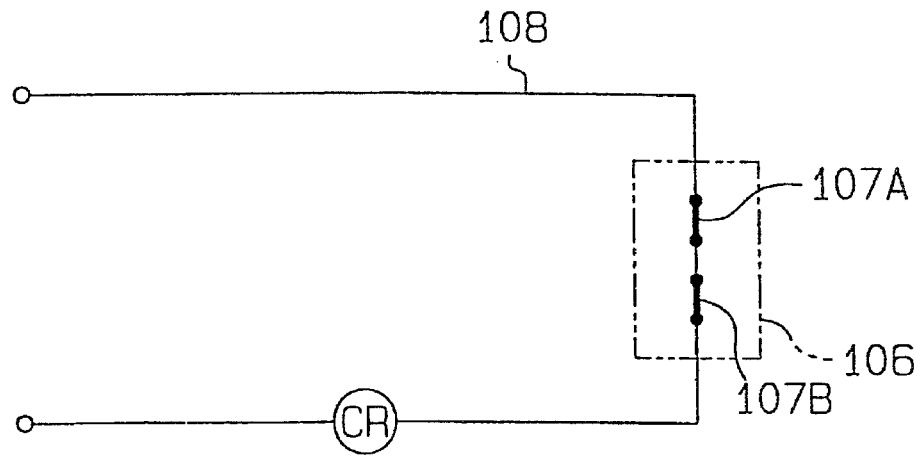
FIG. 16 shows a wiring diagram employed in the third embodiment of the invention.

In the electric circuit 108 shown in FIG. 16, the copper wires 107A, 107B are connected in series, and this serial circuit is connected to a relay CR in series. To the electric circuit 108 is applied a voltage of 24 V.

If an external force is applied on the thus constituted seal belt 106 such as to cause the seal belt 106 to be torn, either the copper wire 107A or the copper wire 107B is disconnected before the seal belt 106 is completely torn to stop energization of the circuit 108. The relay CR is thus actuated to output a detection signal corresponding to the disconnection from the contact of a relay coil (not shown) to a control unit (not shown) such as a personal computer. Thus, the subsequent tearing off of the seal belt 106 can be detected beforehand based on the detection signal.

It should be noted here that the copper wires 107A, 107B are embedded in the seal belt 106 in the third embodiment, so that it never happens that the copper wires 107A, 107B are disconnected by external cause such as extraneous matters intruded between the seal belt 106 and the slit 74. Accordingly, this embodiment enjoys an advantage that there occurs no malfunction due to the external cause.

Figure 17:
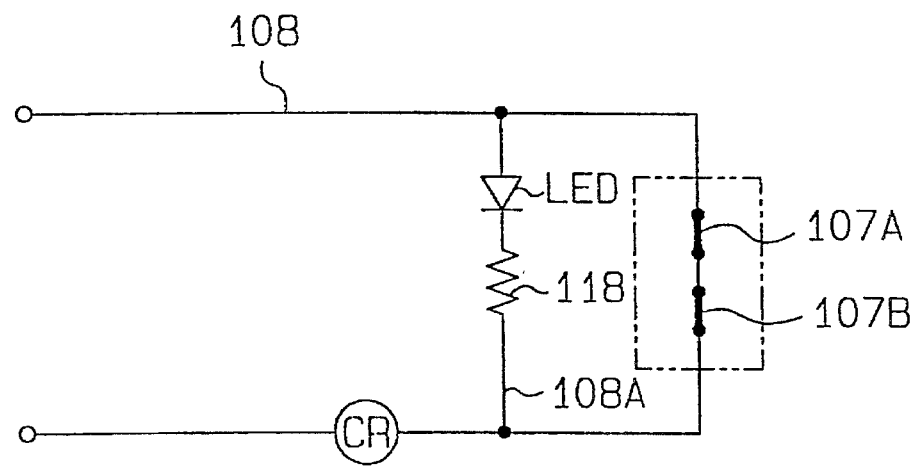
FIG. 17 shows a variation of the circuit diagram employed in the third embodiment of the invention.

FIG. 17 shows a variation of the electric circuit 108, in which the electric circuit 108 shown in FIG. 16 is additionally provided with an indicator circuit 108A having a light emitting diode LED and a resistor 118. Accordingly, if either the copper wire 107A or the copper wire 107B is disconnected, the electric current runs through the indicator circuit 108A to light the light emitting diode LED, and the relay CR is actuated simultaneously to output a detection signal like in the above embodiment. Disconnection of the copper wire 107A, 107B can thus be identified by the emission from the light emitting diode LED, whereby the subsequent tearing off of the seal belt 106 can be detected beforehand.

Figure 18:
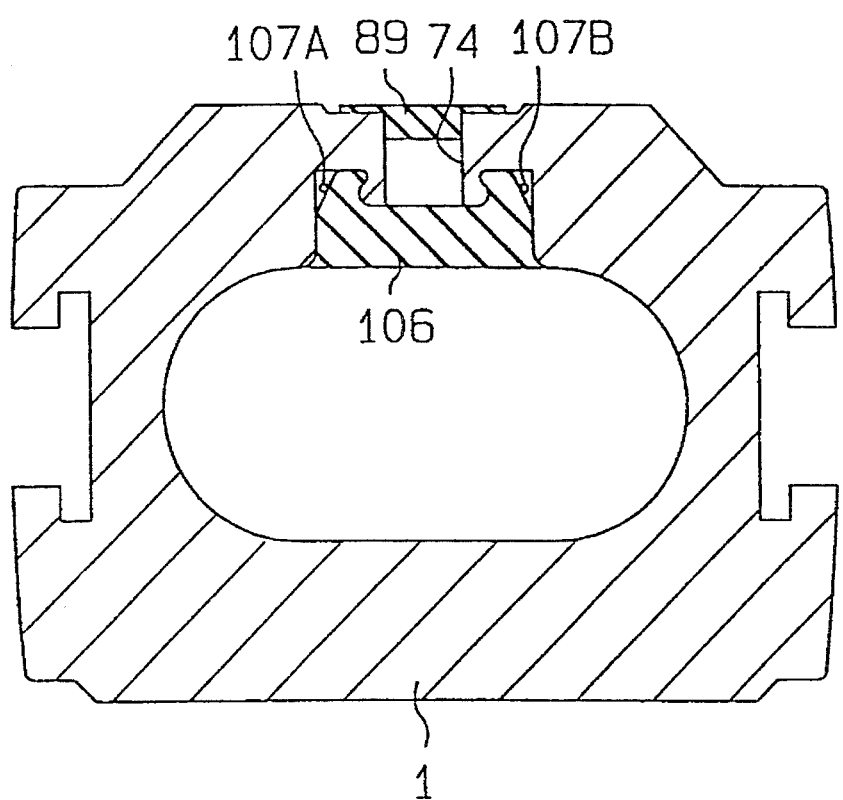
FIG. 18 shows in cross-sectional view a variation of the seal belt employed in the third embodiment of the invention.
Figure 19:
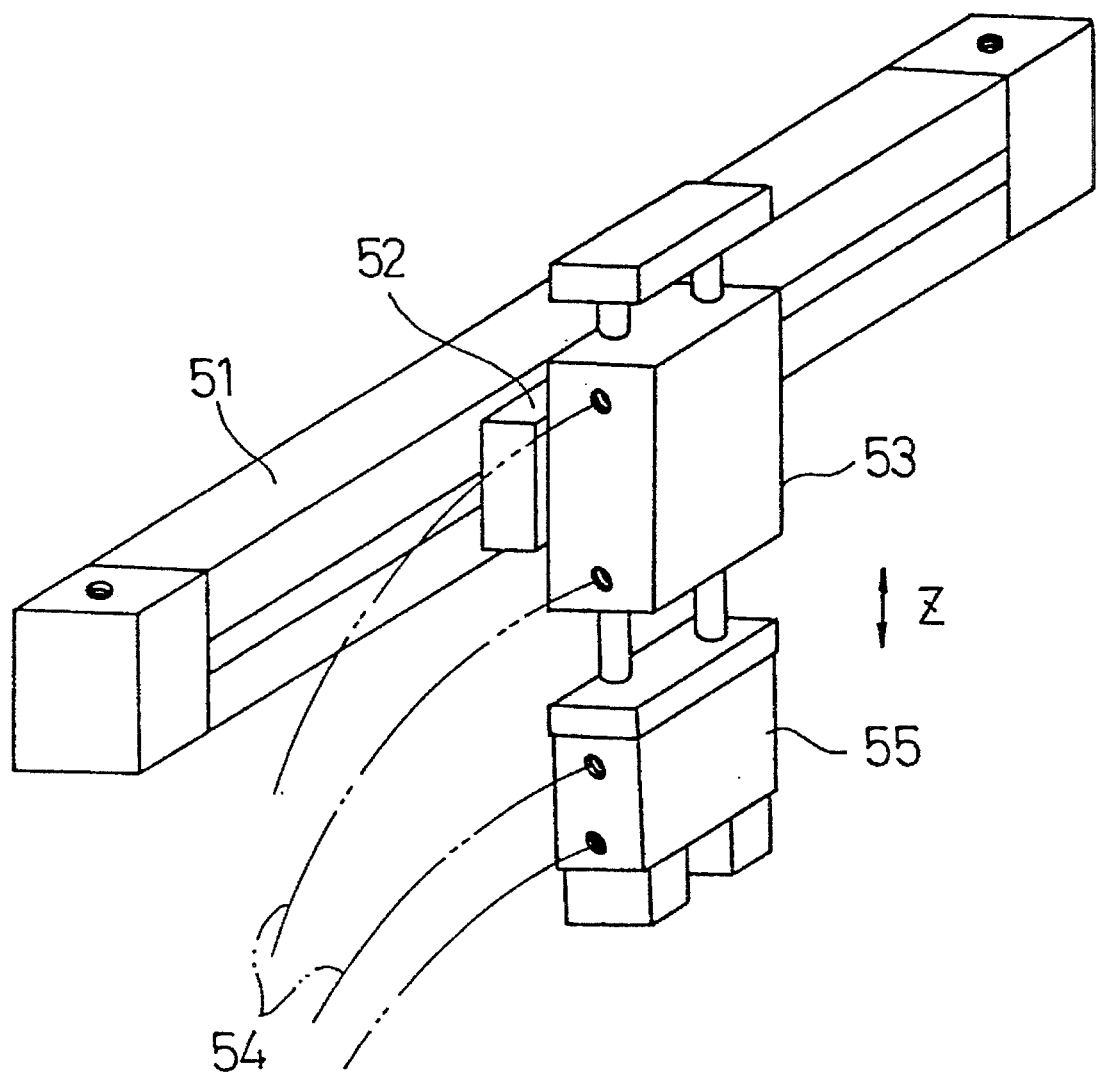
FIG. 19 shows in perspective view a conventional rodless cylinder.

FIG. 18 shows a variation of the arrangement of the copper wires, in which copper wires 107A, 107B are adhered on the upper side faces of a seal belt 106 by an appropriate means such as an adhesive. Since the copper wires 107A, 107B are disconnected before the seal belt 106 starts to tear in this variation, a still further improved detection accuracy can be provided.

Incidentally, the number of the copper wires may be one or three or more. However, if one copper wire 107 is embedded in the seal belt 106, the copper wire 107 cannot be disconnected unless tearing of the seal belt 106 proceeds to the portion where the copper wire 107 is embedded. Accordingly, it cannot be denied that the detection accuracy is lowered compared with the embodiment where two copper wires are employed, but the production cost can be reduced due to the decreased number of parts. In an embodiment where three or more copper wires are used, the detection accuracy can further be improved. Meanwhile, the constitution of the electric circuit 108 may not be limited to the embodiments described above, and any constitution can be employed so long as it is designed to detect disconnection of the copper wires 107 and output a detection signal. Further, it is also possible to use other conductive material in place of the copper wire.

Although three embodiments of the present invention have been described herein, it should be apparent to those skilled in the art that the present invention may be embodied in many other specific forms without departing from the spirit or scope of the invention.

What is claimed is:

1. A rodless cylinder comprising:

a cylinder barrel having a primary passage and a secondary passage extending axially and having first and second slits communicating to the primary and secondary passages, respectively;

a piston movably housed in the primary passage;

a movable member movably housed in the secondary passage;

a mounting table disposed movably along said cylinder barrel and connected to said piston and the movable member through the first and second slits;

an external actuator mounted on said mounting table and driven by a pressure fluid;

said secondary passage for allowing the pressure fluid to pass therethrough;

said second slit for allowing the pressure fluid in said secondary passage to be delivered to the mounting table side; and an outlet defined on said mounting table for communicating to the second slit and for delivering the pressure fluid from said inlet to said external actuator.

2. A rodless cylinder according to claim 1, wherein said cylinder barrel has a protrusion extending longitudinally in which said secondary passage is defined.

3. A rodless cylinder according to claim 2, wherein said protrusion is formed integrally with said cylinder barrel.

4. A rodless cylinder according to claim 2, wherein said movable member includes a yoke; said yoke is movably housed in said secondary passage and connected to said mounting table via a connecting section extending therefrom to the outside of said protrusion; and a sealing belt which can seal said second slit is disposed along the inner edges of said second slit with a packing for sealing the space between said protrusion and said mounting table being disposed therebetween.

5. A rodless cylinder according to claim 1, wherein said external actuator includes a cylinder and an electromagnetic valve for controlling the operation of said cylinder, and the pressure fluid is fed to said cylinder via said electromagnetic valve.

6. A rodless cylinder according to claim 1, wherein said external actuator is a braking device for applying a braking force to said mounting table; said braking device including a rail extended longitudinally along said mounting table, a brake member which is supported in said mounting table so as to be able to swing therein and which exerts a braking force when engaged with said rail and a drive unit for driving said brake member with the aid of the pressure fluid.

7. A rodless cylinder according to claim 6, wherein said drive unit comprises:

a pressure chamber in which at least one end portion of said brake member can be housed;

a pair of engaging members housed in said pressure chamber which can be engaged with said brake member in two directions opposite to each other;

a pair of springs for urging said two engaging members respectively toward said brake member to be in engagement therewith, the first spring being designed to have resilience greater than that of the second spring, and said engaging members being normally engaged with said rail based on the difference in the resilience between said springs;

a pipe connecting said outlet with said pressure chamber for feeding the pressure fluid to said pressure chamber; and an electromagnetic valve which can close said pipe, the pressure fluid being fed from said outlet to said pressure chamber while said pipe is let open by said electromagnetic valve to allow said brake member to be spaced from said rail against the resilience of said first spring with the aid of the pressure of the pressure fluid.

8. A rodless cylinder according to claim 1, further comprising an inner seal belt disposed along the inner edges of said first slit and inserted partly to the lower portion of said piston and an outer seal belt disposed along the outer edges of said first slit and inserted partly to the upper portion of said piston, whereby the inside of said cylinder barrel can be sealed hermetically.

9. A rodless cylinder according to claim 8, wherein said inner seal belt comprises an elastic base material and a flexible reinforced fiber reinforcing material embedded in said base material.

10. A rodless cylinder according to claim 9, wherein said reinforced fiber is a yarn formed by twisting polyamide filaments.

11. A rodless cylinder according to claim 8, wherein said inner seal belt is provided with a conductive material and an electric circuit which detects disconnection of said conductive material and outputs a predetermined signal.

12. A rodless cylinder according to claim 11, wherein said conductive material is at least one copper wire embedded longitudinally in said inner seal belt.

13. A rodless cylinder according to claim 11, wherein said conductive material is at least one copper wire adhered longitudinally along the side faces of said inner seal belt.

14. A rodless cylinder comprising:

a cylinder barrel with a slit formed axially therein;

a piston movably housed in said cylinder barrel;

a mounting table disposed movably along the external surface of said cylinder barrel and connected to said piston through said slit; and an inner seal belt disposed along the inner edges of said slit and partly inserted to the lower portion of said piston and an outer seal belt disposed along the outer edges of said slit and partly inserted to the upper portion of said piston, so as to seal the inside of the cylinder barrel hermetically;

wherein said inner seal belt comprises an elastic base material and a reinforced material woven into a fabric by using flexible reinforced fibers, said reinforced material being embedded in the base material.

15. A rodless cylinder comprising:

a cylinder barrel with a slit formed axially therein;

a piston movably housed in said cylinder barrel;

a mounting table disposed movably along the external surface of said cylinder barrel and connected to said piston through said slit; and an inner seal belt disposed along the inner edges of said slit and partly inserted to the lower portion of said piston and an outer seal belt disposed along the outer edges of said slit and partly inserted to the upper portion of said piston, whereby to seal the inside of the cylinder barrel hermetically;

wherein said inner seal belt is provided with a conductive material and an electric circuit which detects disconnection of said conductive material and outputs a predetermined signal.

16. A rodless cylinder according to claim 10, wherein said reinforced fibers are woven into a fabric.

* * * * *